Dec. 25, 1928. 1,696,500
C. E. MORRIS
CAROUSEL
Filed July 26, 1926   6 Sheets-Sheet 1
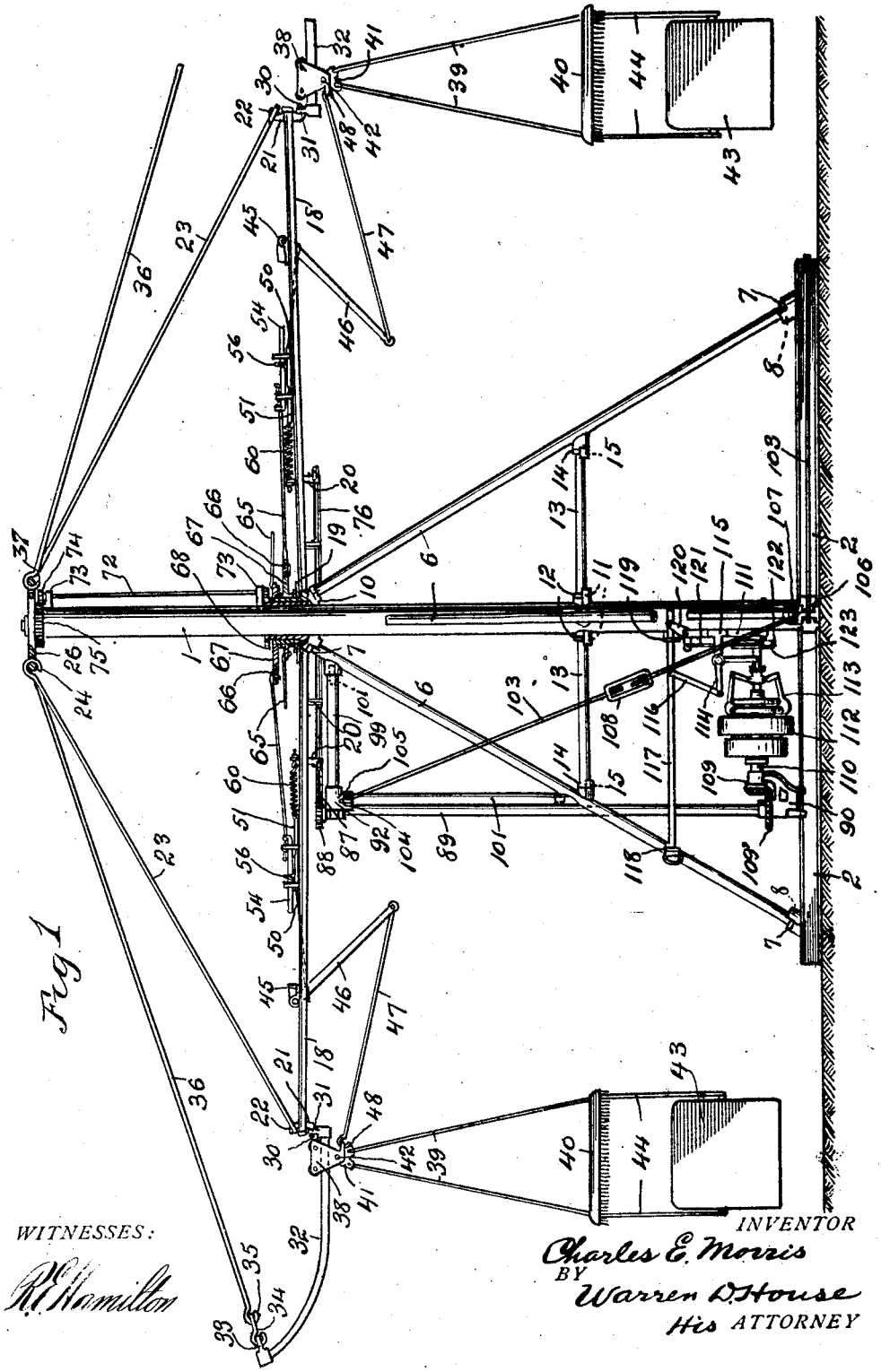
WITNESSES:
R. P. Hamilton
INVENTOR
Charles E. Morris
BY
Warren D. House
His ATTORNEY

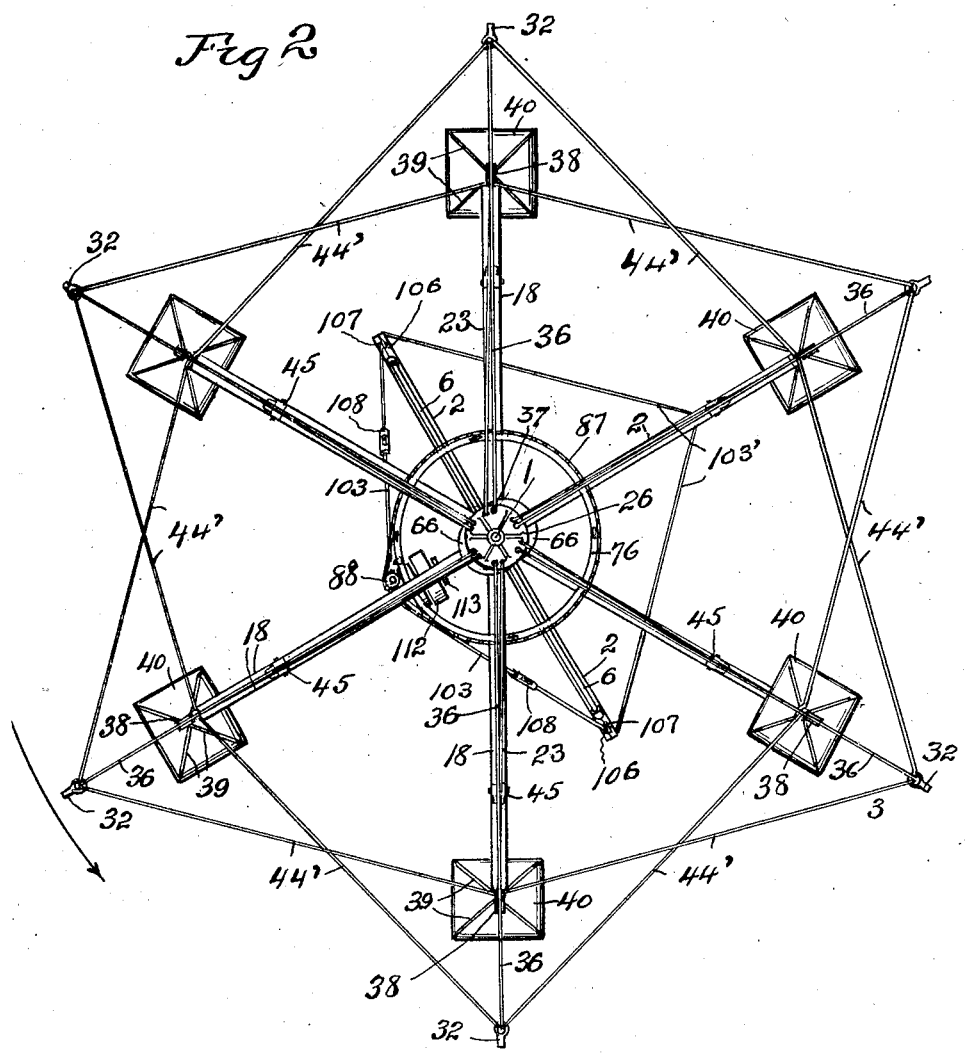

Dec. 25, 1928.  
C. E. MORRIS  
CAROUSEL  
Filed July 26, 1926
1,696,500
6 Sheets-Sheet 3
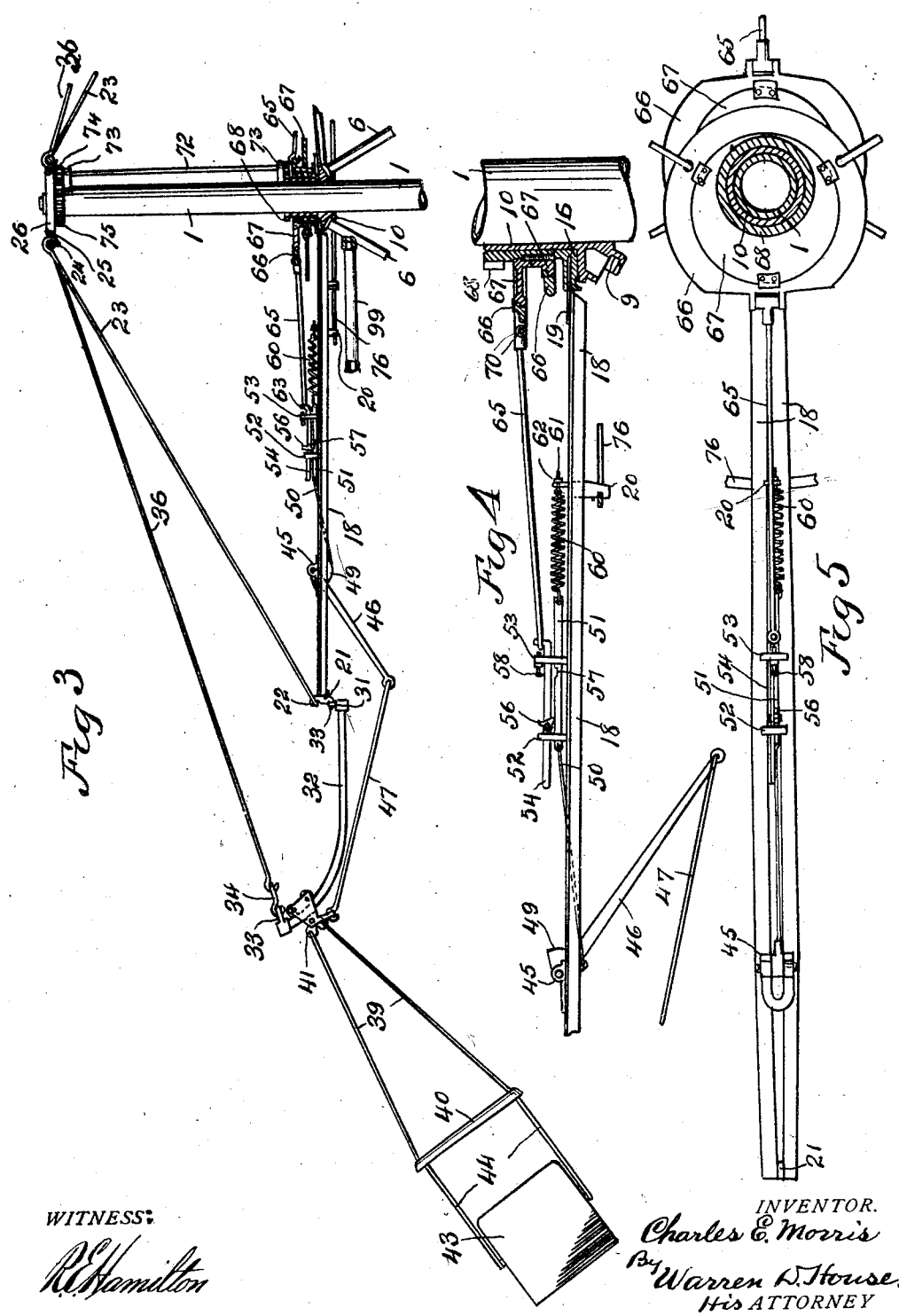
WITNESS:  
R. E. Hamilton
INVENTOR.  
Charles E. Morris  
By Warren D. House.  
His ATTORNEY Dec. 25, 1928.

C. E. MORRIS 1,696,500

CAROUSEL

Filed July 26, 1926   6 Sheets-Sheet 4

WITNESSES:
R. E. Hamilton

INVENTOR.
Charles E. Morris
BY Warren W. House,
His ATTORNEY

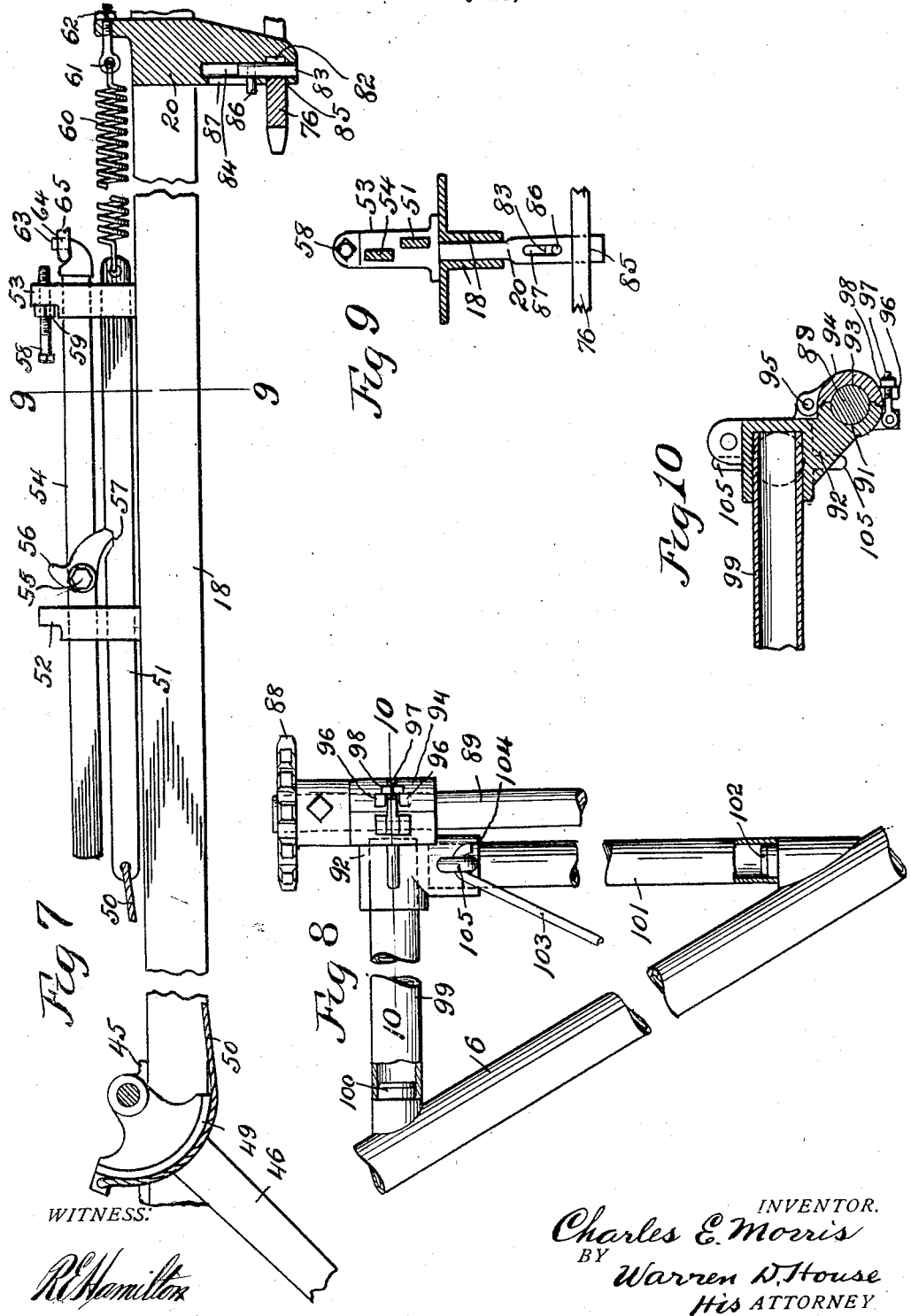

Dec. 25, 1928.  
C. E. MORRIS  
CAROUSEL  
Filed July 26, 1926    6 Sheets-Sheet 6  
1,696,500
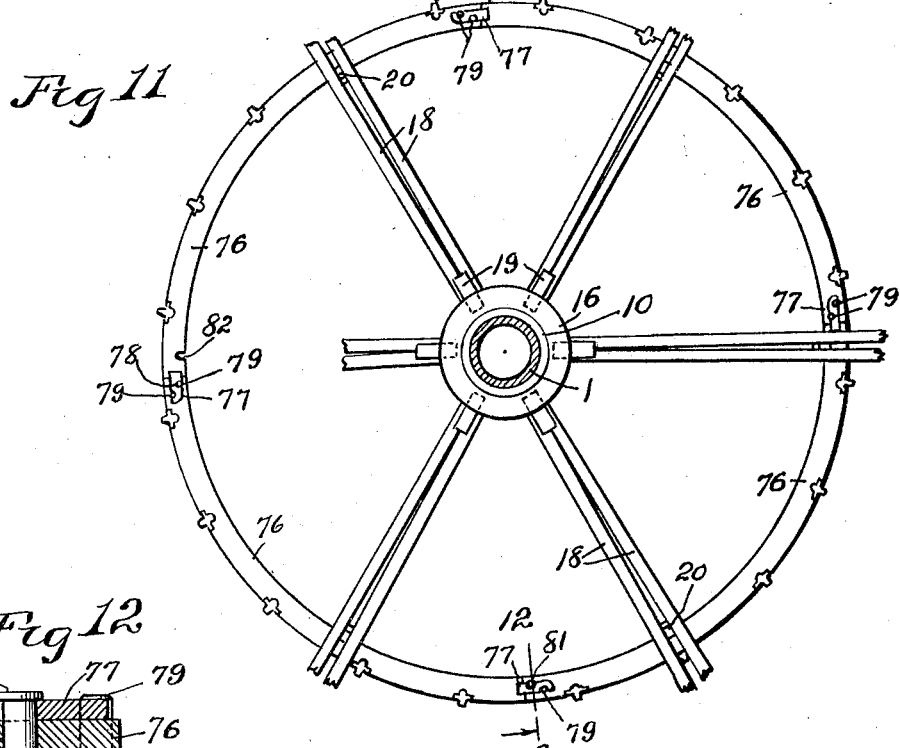
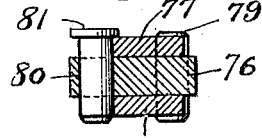
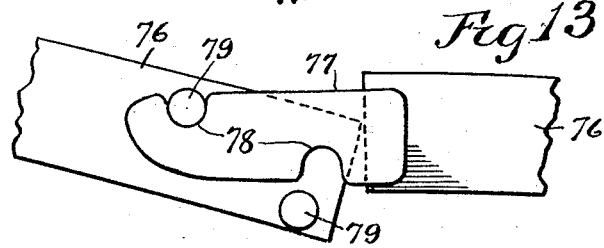
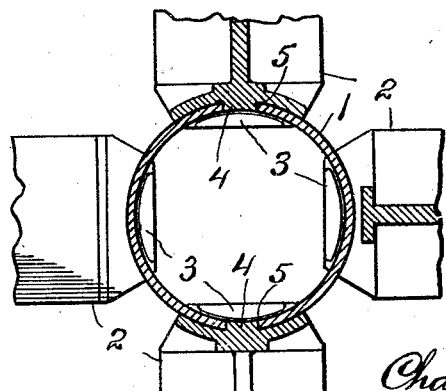
WITNESSES:  
R. E. Hamilton
INVENTOR.  
Charles E. Morris  
BY Warren W. House  
His ATTORNEY Patented Dec. 25, 1928.

1,696,500

UNITED STATES PATENT OFFICE.

CHARLES E. MORRIS, OF LEAVENWORTH, KANSAS.

CARROUSEL.

Application filed July 26, 1926. Serial No. 124,935.

My invention relates to improvements in carrousels.

It is particularly well adapted for use in connection with carrousels of a type having a center pole on which are revoluble radial sweeps from which passenger carrying devices, such as swings, are suspended and are adapted for inward and outward movement thereon.

One of the objects of my invention is to provide a carrousel of the kind described with novel means by which the passenger carrying devices move outwardly by a natural force, which may be centrifugal force effected by the revolution of the support for the passenger carrying devices, and by which the devices are periodically mechanically forced inwardly against said force, and are then suddenly released and permitted to move quickly outwardly, whereby the passengers obtain pleasing and thrilling sensations.

A further object of my invention is to provide a novel arrangement by which oppositely disposed passenger carrying devices are simultaneously forced inwardly and released, so as to equalize the strain upon the structure.

My invention provides further novel means for supporting the passenger carrying devices, whereby the latter in their outward movement also move upwardly.

My invention provides still further a structure which is relatively simple and cheap, which is durable, safe, strong, not liable to get out of order, which can be easily and quickly assembled in operative condition, and as readily disassembled, which has interlocking parts so arranged as to dispense with accessory fastening devices, such as bolts and nuts, that are liable to loosen in use, and which has novel driving means for the moving parts.

The novel features of my invention are hereinafter fully described and claimed.

In the accompanying drawings, which illustrate the preferred embodiment of my invention.

Fig. 1 is a view partly in side elevation and partly in vertical section, and partly broken away, of my improved carrousel shown in the position occupied by the parts when the movable parts are at rest.

Fig. 2 is a plan view of my improved carrousel.

Fig. 3 is a fragmental view partly in vertical section and partly broken away, showing one of the passenger carrying devices released and swung outwardly by centrifugal force.

Fig. 4 is a vertical sectional view of one of the sweeps, broken away, and some of the parts connected therewith, in positions occupied by them when at rest.

Fig. 5 is a plan view of what is shown in Fig 4, the center pole being shown in cross section.

Fig. 7 is an enlarged vertical sectional view of a portion of one of the sweeps and some of the part mounted thereon.

Fig. 8 is an elevation, partly broken away, of the mechanism for supporting the vertical driving shaft, a portion of which is shown.

Fig. 9 is a section on the line 9—9 of Fig. 7.

Fig. 10 is a section on the line 10—10 of Fig. 8.

Fig. 11 is a plan view of the sectional sprocket wheel and portions of the sweeps which support it.

Fig. 12 is an enlarged section on the line 12—12 of Fig. 11.

Fig. 13 is an enlarged plan view of two adjacent end portions of two sprocket wheel sections.

Fig. 14 is a sectional view on the line 14—14 of Fig. 6.

Similar reference characters designate similar parts in the different views.

Figure 6:
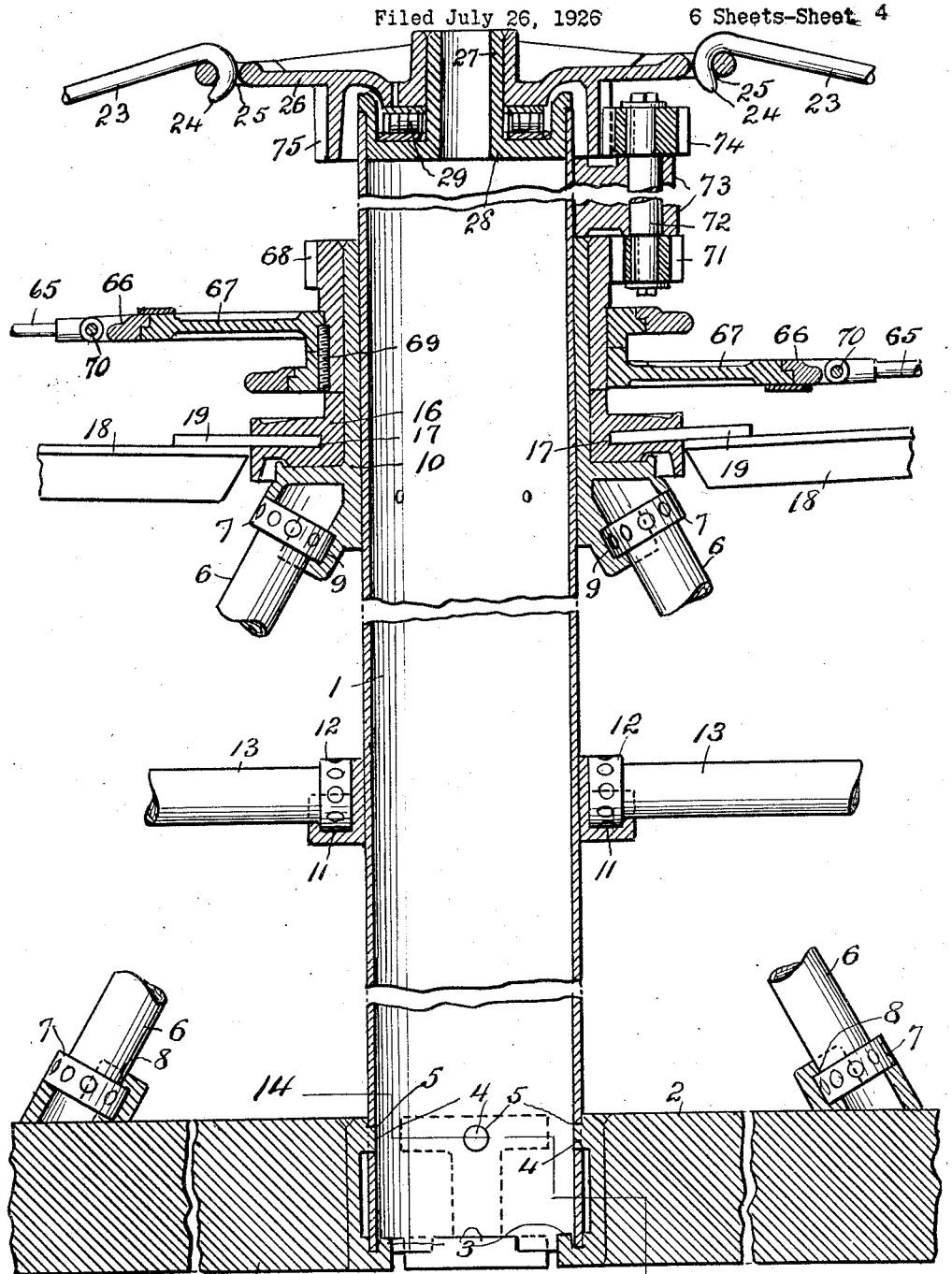
Fig. 6 is an enlarged central vertical sectional view, partly broken away and parts omitted, of the center pole, support therefor, and parts connected therewith.

1 designates a center pole, preferably a steel tube, the lower end of which rests upon inner end portions of horizontal supporting H beams 2, having lips 3 which extend into the lower end of the pole 1, and having respectively projections 4 which enter lateral holes 5 in the pole 1, see Fig. 6 and Fig. 14.

Upwardly and inwardly inclined brace bars 6 have peripheral flanges 7 at their lower ends respectively fitted in upwardly and outwardly facing arcuate grooves 8 with which the beams 2 adjacent to their outer ends are provided.

The upper ends of the brace bars 6 have also peripheral flanges 7 which respectively fit in upwardly and outwardly facing arcuate grooves 9 in a sleeve 10 which is mounted on and fastened to the pole 1. The latter has upwardly facing arcuate grooves 11 in which are fitted the peripheral flanges 12 on the inner ends of transverse brace bars 13, the outer ends of which have similar flanges 14 fitted in upwardly facing arcuate grooves 15 on the inner sides of the brace bars 6. The latter hold the pole 1 vertical, and the bars 13 hold the brace bars 6 in their positions.

Rotatably mounted on the sleeve 10 is a hub 16 of a revoluble support, the hub having radial peripheral slots 17 in which are respectively removably fitted the inner ends of horizontal radial sweeps, each of which comprises, preferably two angle bars 18 to the inner ends of which is fastened a plate 19, and a bracket 20 welded to and between the bars 18, the plates 19 being respectively removably fitted in the hub holes or slots 17, Figs. 6 and 7.

Between each pair of sweep bars 18 at the outer ends thereof is welded a plate 21 having a hook 22 at its upper end. Guy rods 23 having hooks at their outer ends respectively engaging the hooks 22, and removable therefrom, are provided at their upper ends with hooks 24 removably fitted respectively in holes 25 provided in a cap 26, Figs. 1 and 6, which is revoluble on a tubular central stem 27 of a circular plate 28 mounted in the upper end of the pole 1.

The plate 28 supports rollers 29 upon which rests the cap 26, Fig. 6.

Each plate 21 has at its lower end a hook 30, Figs. 1 and 3. The hooks 30 have removably mounted in them eyes 31 respectively provided at the inner ends of radial rails 32, the outer ends of which curve outwardly and upwardly and have fastened to them respectively eyes 33 to which are connected links 34 which respectively are releasably engaged by hooks 35 at the outer ends of guy rods 36, the upper ends of which have hooks 37 removably fitted in holes provided therefor in the cap 26, Fig. 1 and Fig. 2.

The rails 32 serve as tracks upon which are adapted to respectively rest and run wheeled carriages 38, Figs. 1 and 3, one of which is provided with each passenger carrying device, each of which has four supporting rods 39 fastened to its roof 40, the upper ends of the rods 39 being fastened to a plate 41 which is pivoted to the carriage 38 by a transverse bolt 42, whereby the roof 40 and parts supported by it may swing by centrifugal force outwardly. A car 43, which may have suitable seats, is supported from the roof 40 by rods 44.

As shown in Fig. 2, crossed tie rods 44' may be detachably fastened to the outer ends of the rails 32 and to the outer ends of adjacent sweep bars 18.

When the sweeps are revolved with the hub 16 on the sleeve 10, the centrifugal force will cause the cars 43 to swing outwardly and the carriages 38 to travel outwardly and then upwardly on the rails 32, Fig. 3. In order that the passenger carrying cars 43 and the carriages 38 which support them, may be forced inwardly against the centrifugal force which forces them outwardly, the following described mechanism may be provided.

Upon each sweep is mounted two bearings 45 in which is oscillatively mounted the upper end of a downwardly extending lever 46, Figs. 4, 5 and 7 to the lower end of which is fastened a rod 47 the outer end of which has a hook 48 removably mounted in a hole provided therefore in the adjacent carriage 38, Figs. 1 and 3.

Each lever 46 is provided with a concentric arcuate portion 49, Fig. 7, on the periphery of which is mounted a cable 50, one end of which is fastened to the lever 46 and the other end of which is fastened to the outer end of a radial reciprocative member comprising a bar 51, which is mounted slidably in a slot provided therefor in an outer bearing 52 mounted on and welded to the sweep bars 18, Figs. 7 and 9. The bar 51 is also slidable in a slot provided therefor on an inner bearing 53 also welded to the upper sides of the sweep bars 18.

Similarly reciprocative in the bearings 52 and 53 is a radial bar 54, above the bar 51, and which has pivoted to it on a horizontal axis by a bolt 55, a latch 56, which is adapted to drop by gravity into a notch 57 in the upper edge of the bar 51, Fig. 7.

When the bar 54 is forced inwardly, as will be described, due to the revolution of the sweep, the latch 56 will enter the notch 57, and the bar 51 will be forced longitudinally inwardly therewith.

The cable 50 will thus swing the lever 46 inwardly thus by means of the rod 47 pulling inwardly on the rail 32 the adjacent carriage 38 and with it the car 43 carried by said carriage.

To release the latch 56 from the bar 51 at a predetermined point, there is provided an abutment comprising a radial bolt 58, Fig. 7, which is fitted in a threaded hole in the inner bearing 53, and which is in the path of the upper end of the latch 56. A lock nut 59 is on the bolt 58 and bears against the bearing 53. When the latch 56 strikes the bolt 58, the latch will be swung out of the notch 57, and the centrifugal force will force the car 43 and the carriage 38 suddenly outwardly, thus imparting a pleasing and thrilling sensation to the passengers in the car.

A retracting coil spring 60 has one end fastened to the inner end of the bar 51, the inner end of the spring being attached to a radial bolt 61, Fig. 7, fitted in a threaded hole in the upper end of the adjacent bracket 20. A lock nut is mounted on the bolt 61 and is designated by 62.

The springs 60 serve to retract the bars 51 inwardly when the sweeps are stationary and the cars 43 assume the inner positions shown in Fig. 1.

For forcing the bars 54 inwardly, the latter are provided each at its inner end with an upwardly extending arm 63. Respectively removably fitted on the arms 63 are eyes 64 at the outer ends of radial rods 65, two opposite ones of which are hinged on horizontal axes to opposite outer edges of two straps 66 which are respectively revoluble on two eccentrics 67, which are oppositely disposed and are mounted one above the other on the hub of a gear wheel 68, Fig. 6, a vertical screw 69 being fitted in a vertical hole between the eccentric disks 67 and the hub of the gear wheel 68.

One half of the number of the remaining rods 65 have at their inner ends hooks 70 fitted in holes provided in the upper strap 66, and the other half are similarly connected to the lower strap 66. By this arrangement oppositely disposed rods 65 are connected to opposite edges of different straps 66, so that the cars pulled in thereby will be simultaneously pulled in and simultaneously released, thereby equalizing the strain on the structure.

The gear wheel 68 meshes with a pinion 71, Fig. 6 fastened to a vertical shaft 72 rotatable in bearings 73 on the pole 1. A pinion 74 fastened to the shaft 72 meshes with teeth 75 provided on the periphery of the cap 26.

The ratio of this connecting gearing is such that relative movement in the same direction between the cap and the gear wheel 68 will occur. Thus if the pitch diameter of the teeth 75 is 12 inches, that of the pinion 74 three inches, that of the pinion 71 two and one half inches, and that of the gear wheel 68 twelve and one half inches, the cap 26 will make five revolutions to four of the gear wheel 68, and the carriages 38 and cars 43 will each be once drawn inwardly and suddenly released during five revolutions of the cap 26 and sweeps 18.

For driving the sweeps, there is secured to the brackets 20 under the sweep members 18 a horizontal driving wheel, which is preferably a sprocket wheel and which is constructed as follows.

The sprocket wheel is made, preferably, in sections 76, Figs. 1, 2, 11, 12 and 13, each of which at one end has two arms 77 each having on opposite sides respectively notches 78 adapted to receive two pins 79 with which each end of each section 76, excepting one, is provided.

One of the sections 76, Fig. 11 and Fig. 12 has a hole 80 in which is removably fitted a pin 81.

In assembling the sections 76, the arms 77 of one section are inserted between the pins 79 of the next adjoining section, after which the next section is similarly engaged with the last one, and so on until the last section which is the one having the hole 80. This section has its arms 77 fitted in the last section between the pins thereof, and is then swung to the circular position, Fig. 11, in which position the hole 80 will aline with one of the notches in each arm 77 of the adjacent section. The pin 81 is then inserted in the hole 80 and in the adjoining notches 78, whereby the sections of the wheel will all be locked firmly together.

The inner side of each section 76 is provided with notches 82 adapted to respectively receive bracket pins 83, Fig. 7, one of which is vertically slidable in a vertical hole 84 of each bracket 20. The latter is provided with a lateral notch 85 in its outer side adapted to receive the adjacent wheel section 76, and the pin 83 may have a laterally extending pin 86 slidable in a slot 87 which communicates with the hole 84. By means of the pin 86 the pin 83 may be lifted clear of the section 76. In Fig. 13 is shown the manner of insertion of the arms 77 between the pins 79.

The sprocket wheel is engaged by a sprocket chain 87 which engages a sprocket wheel 88 fastened to a vertical driving shaft 89, Figs. 8 and 10, the lower end of which is rotatable in a bracket 90, Fig. 1, which is mounted on one of the beams 2. The upper end of the shaft 89 is rotatable in a bearing comprising an elbow 92 having a semicircular recess 91, Fig. 10, which co-operates with a similar recess 93 in a cap 94 hinged on a vertical pin 95 to the elbow 92. For holding the cap in operative position, it has two lugs 96 between which is adapted to be swung a bolt 97 hinged to the elbow 92, and having a nut 98 bearing against the lugs 96.

In the horizontal arm of the elbow 92 is fitted removably a pipe 99, Figs. 1 and 8, in the inner end of which is removably fitted a projection 100 on the outer side of an adjacent bar 6. In the vertical arm of the elbow 92 is fitted the upper end of a vertical pipe 101, in the lower end of which is removably fitted a projection 102, which is on the outer side of the bar 6 having the projection 100.

Guy braces 103 have at their upper ends hooks 104 respectively removably fitted in eyes 105 on opposite sides of the elbow 92, Figs. 1, 2, 8 and 10. The lower ends of the braces 103 have hooks 106 respectively removably attached to eyes 107 on two oppositely disposed beams 2. Each brace 103 may be provided with a turnbuckle 108, for adjusting and tightening said braces.

Two tie rods 103′, Figs. 1 and 2, are attached to the outer ends of the beams 2, having attached to them the braces 103, said rods 103′ being fastened to the outer end of the beam 2, which is opposite to the one to which is attached the bar 6 provided with the projection 100.

For rotating the shaft 89 it has fastened to it a bevel gear wheel 109′, which meshes with a bevel gear wheel 109 secured to a horizontal shaft 110 rotatable at one end in the bracket 90, and rotatable at its other end in a bearing 111, secured to the pole 1, Fig. 1. A cone pulley 112 is rotatable on the shaft 110, and may be driven by a suitably driven belt, not shown. A clutch 113 on and rotatable with the shaft 110 is adapted to engage and to be driven by the pulley 112. A bell crank lever 114, pivoted to a bearing 115 on the pole 1, has one arm engaging the clutch 113, the other arm being pivoted to the lower end of a link 116, pivoted at its upper end to a horizontal operating bar 117 slidable in bearings 118 and 119 respectively mounted on one of the bars 6 and the pole 1, Fig. 1.

Pivoted on the bearing 115 on the pole 1 is another bell crank lever 120, one arm of which is pivoted to the operating bar 117, and the other arm of which is pivoted to a rod 121 connected to a brake strap 122 which is adapted to embrace a brake wheel 123 fastened to the shaft 110.

When the operating bar 117 is pulled outwardly, the clutch 113 will be made to operatively engage the cone pulley 112 so as to be rotated thereby, thereby rotating the shaft 110, and through the intermediacy of the gears 109, 109′, shaft 89, sprocket wheel 88, chain 87 and sectional sprocket wheel 76, revolving the sweeps 18, and thereby revolving the cars 43 around the pole 1.

When the bar 117 is forced inwardly to the position shown in Fig. 1, the bell crank lever 120 is swung to tighten the brake strap 122 on the brake wheel 123, thus stopping revolution of the shaft 110 and the passenger carrying devices.

When the bar 117 is pulled outwardly to start the revolving of the sweeps, the bell crank lever 120 is swung so as to release the brake wheel 123 from the strap 122.

As the sweeps are revolved with the hub 16, the straps 66 will be revolved on the eccentric disks 67, and the guy rods 23 and 36 will revolve the cap 26, which in turn, by means of the pinion 74, shaft 72, pinion 71, will revolve the gear wheel 68, and with it the eccentric disks 67, in the same direction as the cap 26 four revolutions to five revolutions of the cap, the ratio of the gearing being so proportioned, as before described.

Thus each pair of oppositely disposed bars 54 will be simultaneously drawn inwardly from the position shown in Fig. 7 once during every five revolutions of the sweep bars 18, and in being so drawn the latches 56 carried by said bars 54 will enter the notches 57 of the adjacent bars 51, thereby drawing inwardly the latter and with them the adjacent levers 46, by means of the cables 50, thus drawing inwardly, by means of the rods 47, the adjacent carriages 38 and the cars 43 supported thereby.

When the latches 56 engage the adjacent bolts 58, the latter will swing the latches 56 out of the notches 57, and the bars 51, which have been drawn inwardly by the latches 56, will be suddenly released, and the carriages 38, being released, will, with the cars 43, be forced rapidly outwardly by centrifugal force, the sweeps being revolved at the time. The carriages 38 will travel outwardly and then upwardly on the rails 32 which support them, and the carriages 38 and cars 43 will assume the position shown in Fig. 3, and will so remain until the cars have completed five more revolutions and the bars 51 are again inwardly drawn, or until the sweeps stop revolving.

Oppositely disposed pairs of carriages and cars will thus be simultaneously drawn in and released consecutively.

When the operating bar 117 is forced inwardly to the position shown in Fig. 1, the sweep bars 18 will stop revolving and the carriages 38 will run inwardly on the rails 32 to the position shown in Fig. 1. The springs 60 will retract inwardly the bars 51 to the positions shown in Figs. 1, 4 and 5, where they will remain until the carriages and cars are again forced outwardly by centrifugal force to the position shown in Fig. 3.

In disassembling, the rods 47 are detached from the carriages 38, and the rods 23 and 36 are detached from the cap 26 and from the hooks 22 and links 34 respectively. The rails 32 may then be detached from the hooks 30 and taken down with the carriages 38, the rods 44′ having been detached from the rails.

The cap 26 and the plate 28 may then be lifted from the pole 1. The rods 65 are then detached from the arms 63 of the bars 54 and from the eccentric straps 66.

The tie rods 44′ are detached from the beams 18, and the sections 76 of the sectional sprocket wheel are detached from the brackets 20 by removing the locking bolt 81 and lifting the locking pins 83 clear of the sections 76. The latter may be consecutively detached from each other in a manner the reverse of their assemblage.

The sweeps may then be detached from the hub 16 by the withdrawal of the plates 19 from the slots 17.

The tie rods 103′ are then detached from the beams 2, and the brace bars 103 are detached form the beams 2 and elbow 92. The operating bar 117 is withdrawn from its bearings 118 and 119 after having been detached from the link 116 and the bell crank lever 120.

The gear 109 is loosened on the shaft 110 and the latter is detached therefrom and from the bracket 90 and bearing 111. The bell crank lever 114 is detached from the clutch 113, and the rod 121 detached from the bell crank lever 120.

The nut 98 is loosened and the bolt 97 swung to release the cap bearing 94, upon which the shaft 89 may be detached from the bearing elbow 92 and lifted out of the bracket 90.

The brace bars 13 are then lifted from the grooves 11 and 15 of the pole 1 and bars 6. The latter may now be withdrawn outwardly from the grooves 8 and 9 in the beams 2 and sleeve 10.

The beams 2 may now be unhooked and detached from the pole 1 and the latter lowered by reversing the operation described with reference to the assembling of these parts.

What I claim:—

1. In a carrousel, a revolving support, supporting means therefor, a passenger carrying device movable outwardly by natural force on said support, and means connecting said device with said supporting means by which said device, during the revolutions of said support, is periodically forced inwardly and is then released and permitted to move freely outwardly.

2. In a carrousel, a revolving support, supporting means therefor, a passenger carrying device movable outwardly by centrifugal force on said support, and means connecting said device with said supporting means by which said device, during the revolutions of said support, is periodically forced inwardly and is then released and permitted to move freely outwardly.

3. In a carrousel, a revolving support, supporting means therefor, a passenger carrying device movable outwardly on said support by natural force, and means connecting said device with said supporting means by which said device, during the revolutions of said support, is periodically forced inwardly and is then suddenly released and permitted to move freely outwardly.

4. In a carrousel, a revolving support, supporting means therefor, a passenger carrying device movable outwardly by centrifugal force on said support, and means connecting said device with said supporting means by which said device, during the revolutions of said support, is periodically forced inwardly and is then suddenly released and permitted to move freely outwardly.

5. In a carrousel, a revolving support having a radial track, supporting means for said support, a passenger carrying device movable outwardly by natural force on said track, and means connecting said device with said supporting means by which said device, during the revolutions of said support, is periodically moved inwardly on said track and is then permitted to be released and to move freely outwardly on said track.

6. In a carrousel, a revolving support having a radial track which extends outwardly and upwardly, supporting means for said support, a passenger carrying device movable outwardly and upwardly by centrifugal force on said track, and means connecting said device with said supporting means by which said device, during the revolutions of said support, is periodically forced inwardly on said track against said centrifugal force and is then permitted to move freely outwardly on said track.

7. In a carrousel, a revolving support, a passenger carrying device movable outwardly by natural force on said supporting means for said revolving support, an eccentric mounted on said supporting means, and means actuated by said eccentric, by which said device, during the revolutions of said support, is periodically forced inwardly against the action of said force and is then released and permitted to move outwardly.

8. In a carrousel, a revolving support, a stationary support therefor, a passenger carrying device movable outwardly by natural force on said revolving support, an eccentric disk, means on said stationary support for supporting said disk, said revolving support being revoluble relatively to said disk, and means actuated by said disk by which said device, during the revolutions of said revolving support, is periodically forced inwardly and is then released and permitted to move outwardly.

9. In a carrousel, a revolving support, a stationary support therefor, a passenger carrying device movable outwardly by natural force on said revolving support when the latter revolves, an eccentric disk revoluble relatively to said revolving support on said stationary support, means for so revolving said disk and said revolving support, and means actuated by said disk by which said device, during the revolutions of said revolving support, is periodically forced inwardly and is then released and permitted to move outwardly.

10. In a carrousel, a center pole, a support revoluble thereon, a passenger carrying device movable outwardly by natural force on said support when the latter revolves, an eccentric disk mounted on said pole and relative to which said support is revoluble, and means actuated by said disk by which, when said support is revolved, said device is periodically forced inwardly and then released and permitted to move outwardly.

11. In a carrousel, a center pole, a support revoluble thereon, a passenger carrying device movable outwardly by natural force on said support when the latter is revolved, an eccentric disk revoluble on said pole relatively to said support, and means actuated by said disk by which, when said support is revolved, said device is periodically forced inwardly and is then released and permitted to move outwardly.

12. In a carrousel, a center pole, a support revoluble thereon, a passenger carrying device movable outwardly by natural force on said support when the latter is revolved, an eccentric disk revoluble on said pole, driving means by which said support and said disk are revolved at different rates of revolutions, and means actuated by said disk by which said device, during the revolutions of said support, is periodically forced inwardly and is then released and permitted to move outwardly.

13. In a carrousel, a center pole, a support revoluble thereon and having a gear wheel revoluble on said pole concentrically therewith, a passenger carrying device movable outwardly on said support by natural force when the support is revolved, a second gear wheel revoluble on said pole, an eccentric disk mounted on and revoluble with said second gear wheel, gearing connecting said two gears by which the latter will revolve relatively to each other, and means actuated by said disk for periodically forcing inwardly said device and then releasing it to permit it to move outwardly.

14. In a carrousel, a center pole, a support revoluble thereon, two passenger carrying devices mounted on said support at opposite sides respectively of said pole and movable outwardly on said support by natural force when said support is revolved, and means connecting said device with said supporting means by which said devices, during the revolutions of said support, are periodically forced inwardly simultaneously and are then simultaneously released and permitted to move freely outwardly.

15. In a carrousel, a revoluble support, supporting means therefor, two passenger carrying devices mounted on said support at opposite sides respectively of the axis of said support and movable outwardly thereon by natural force when said support is revolved, and means connecting said device with said supporting means by which said devices, during the revolutions of said support are periodically forced inwardly simultaneously and are then simultaneously released and permitted to move freely outwardly.

16. In a carrousel, a stationary support, a revoluble support thereon, two passenger carrying devices mounted on said revoluble support at opposite sides respectively of the axis of said revoluble support and movable outwardly on said revoluble support by natural force when the revoluble support is revolved, two oppositely disposed eccentric disks mounted on said stationary support and relatively to which said revoluble support is revoluble, and means actuated by said disks by which said devices, during the revolutions of said revoluble support, are periodically forced inwardly simultaneously and are then simultaneously released and permitted to move outwardly.

17. In a carrousel, a revoluble support, a stationary support therefor, two passenger carrying devices mounted on said revoluble support at opposite sides respectively of the axis of the latter and movable outwardly by natural force when said revoluble support is revolved, two oppositely disposed eccentric disks revoluble together on said stationary support, means actuated by said disks by which said devices, during the revolutions of said revoluble support, are simultaneously forced inwardly and are then simultaneously released and permitted to move outwardly, and driving means connecting said disks and said revoluble support by which the latter and said disks are revolved relatively to each other.

18. In a carrousel, a revoluble support, a passenger carrying device movable outwardly thereon by natural force when said support is revolved, a member reciprocative on said support, means for reciprocating said member when the support is revolved, and means actuated by said reciprocative member by which said device is periodically forced inwardly and is then released and permitted to move outwardly.

19. In a carrousel, a revoluble support, a stationary support therefor, a passenger carrying device movable outwardly by natural force on said revoluble support when the latter is revolved, a member reciprocative on said revoluble support, an eccentric disk mounted on said stationary support and relatively to which said revoluble support is revoluble, means actuated by said disk for reciprocating said member, and means by which when said member is reciprocated, said device will be forced inwardly and then released and permitted to move outwardly.

20. In a carrousel, a revoluble support, a passenger carrying device movable outwardly thereon by natural force when support is revolved, two members reciprocative on said support, a latch carried by one of said members and adapted to operatively engage the other member, whereby said members may move conjointly inwardly, means in the path of said latch for engaging and moving it to the release position, means by which when support is revolved one of said members will be reciprocated thereby, and means actuated by the other member when it is inwardly moved for forcing said device inwardly.

21. In a carrousel, a revoluble support carrying an abutment, a passenger carrying device movable outwardly by natural force on said support when the latter revolves, a stationary support on which said revoluble support is revoluble, an eccentric disk mounted on said stationary support, a member reciprocative on said revoluble support, means actuated by said disk for reciprocating said member, a second member reciprocative on said revoluble support, a latch mounted on one of said reciprocative members and engaging the other reciprocative member whereby said members will move inwardly conjointly, said abutment being in the path of and arranged to engage and move said latch to the release position, and means by which said second member on its inward movement will force said device inwardly until said latch is released.

22. In a carrousel, a stationary support, a support revoluble thereon, a passenger carrying device suspended from and adapted to travel and to swing outwardly on said revoluble support by natural force, and means connecting said device with said supporting means by which said device, during the revolutions of said revoluble support, is forced inwardly against said force and is then released and permitted to move freely outwardly.

23. In a carrousel, a stationary support, a support revoluble thereon, a passenger carrying device suspended from and adapted to travel and to swing outwardly by natural force on said revoluble support when the latter is revolved, an eccentric disk mounted on said stationary support and relatively to which said revoluble support is revoluble, and means actuated by said disk by which said device, during the revolutions of said revoluble support, is forced inwardly and is then periodically released and permitted to move outwardly.

24. In a carrousel, a stationary support, a support revoluble thereon, a passenger carrying device movable outwardly on said revoluble support by natural force when said revoluble support is revolved, an eccentric disk mounted on said stationary support, a strap revolubly engaging said disk, means actuated by said strap by which said device is periodically forced inwardly when said revoluble support is revolved, and means by which said device is released when moved inwardly to a pre-determined position and permitted to move freely outwardly.

25. In a carrousel, a revoluble support, a stationary support therefor, a passenger carrying device movable outwardly on said revoluble support by natural force, when said revoluble support is revolved, an eccentric disk mounted on said stationary support, a strap revolubly engaging said disk, a member reciprocative on said revoluble support, a rod connecting said strap and said reciprocative member, means actuated by said reciprocative member for forcing said device inwardly when said member is moved in one direction, and means by which said forcing means is released from said reciprocative member when said device has moved inwardly to a pre-determined position.

26. In a carrousel, a revoluble support, a stationary support therefor, a passenger carrying device movable outwardly on said revoluble support by natural force when said revoluble support is revolved, an eccentric disk mounted on said stationary support, means by which said disk is revolved relatively to said revoluble support, a strap revolubly engaging said disk, a member reciprocative on said revoluble support, a rod connecting said member and said strap, a second member reciprocative on said revoluble support, a latch connecting said members by which said second member is moved in one direction simultaneously with the other member, means in the path of travel of said latch for engaging and releasing the latch, and means actuated by said second member for forcing said device inwardly when said latch is operatively engaging both of said members.

In testimony whereof I have signed my name to this specification.

CHARLES E. MORRIS.